(Model.)

C. H. LAWTON.
INSECT TRAP.

No. 550,891. Patented Dec. 3, 1895.

Witnesses.
Thomas Maher.
Frederick Ladd.

Inventor.
C. H. Lawton

ANDREW B. GRAHAM, PHOTO-LITHO, WASHINGTON, D.C.

UNITED STATES PATENT OFFICE.

CHARLES H. LAWTON, OF NEW YORK, N. Y., ASSIGNOR TO A. S. LAWTON, OF SAME PLACE.

INSECT-TRAP.

SPECIFICATION forming part of Letters Patent No. 550,891, dated December 3, 1895.

Application filed June 7, 1892. Renewed March 7, 1895. Serial No. 540,862. (No model.) Patented in England May 30, 1892, No. 10,292.

*To all whom it may concern:*

Be it known that I, CHARLES H. LAWTON, a citizen of the United States, and a resident of the city, county, and State of New York, have invented a new and Improved Trap for Cockroaches and other Bugs, of which the following is a specification, and for which I have taken out a patent in Great Britain, No. 10,292, bearing date May 30, 1892.

My invention consists of a trap for catching bugs of all kinds; but especially adapted for the capture of cockroaches and the red roaches commonly known as "water-bugs."

The trap comprises a base and cover, with inlet for the bugs through the base under cover.

The trap is so constructed and the parts arranged that it may be readily opened for cleaning and disposal of bugs caught therein. The peculiarities of its construction are as hereinafter more fully described, reference being had to the accompanying drawings, in which—

Figure 1:
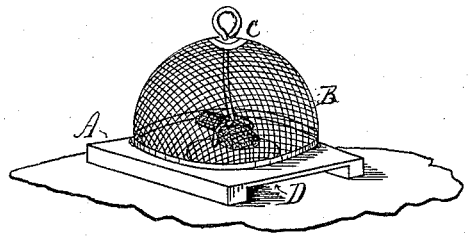
Figure 2:
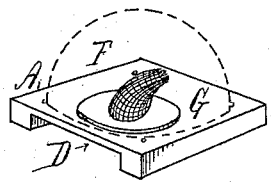
Figure 4:
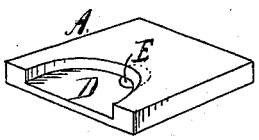
Figure 3:
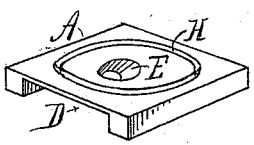
Figure 6:
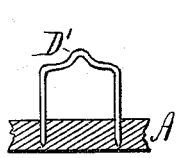
Figure 5:
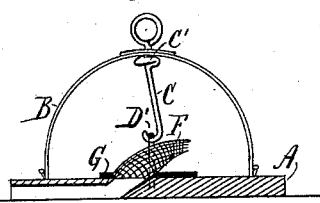
Figure 7:
Figure 8:
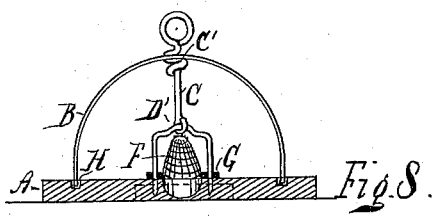

Figure 1 represents in perspective the trap complete. Fig. 2 represents in perspective the base-block with inlet for bugs and tubular entrance of wire netting or gauze, also felt mat around the opening, which when wet serves to attract bugs. Dotted lines show portion of cover, also the parts hidden in base. Fig. 3 is a perspective view of base-block alone with central aperture to which the tubular entrance is attached when finished. Fig. 4 shows in perspective base-block reversed. Fig. 5 is a sectional view through base-block and trap complete. Figs. 6 and 7 show the devices used for uniting base-block and cover. Fig. 8 is a sectional view of trap complete on a line transverse to that of Fig. 5.

On the drawings, A indicates the base-block, which may be of wood or any other suitable material. It is shown as square, but it may be circular or any other desirable shape.

B indicates the cover, hemispherical or dome shaped, of wire-gauze. Preferably the cover is shown as resting on top of the base-block, but to round blocks it might fit over the outer edge of the block.

To secure the cover to the block a hook is used, as shown at C, with ring at top for handling and hanging the trap whenever desirable. The hook passes downward through apex of cover to a staple at D', the latter secured in or to the base-block. A twist may be given the wire of the hook beneath the cover at C' to prevent the withdrawal of the hook or other means used therefor.

D indicates the inlet, cut or otherwise formed in the under side of the base-block, leaving a portion of the block above as a cover, which forms a covered way which attracts the bugs, as they are fond of hiding and naturally run under cover. At E a hole is cut through the block, preferably in a slanting direction, as shown in Fig. 5, forming an incline. At F is a tubular entrance-way forming a continuation of the aperture E, the tube bending over and somewhat contracted at its interior end. The tube is of wire (woven) or wire-gauze, with points of wire projecting at the end to prevent escape of bugs after they have once passed to inside of trap. At G, around the tubular entrance upon the base-block, is shown a piece of felt or other suitable material, which can be readily saturated with water which the bugs scent afar, and it serves as an attractive bait, inducing them to enter. At H is shown a groove, cut or recessed into the base-block, into which I set the rim of the wire cover when square bases are used. It prevents escape of bugs through warping of the block, which may sometimes occur when wooden bases are used.

What I claim as new, and desire to secure by Letters Patent of the United States, is—

1. A bug trap consisting of a base block and hemispherical cover, the base block undercut to form a passage way and centrally an entrance to the interior from beneath the undercut portion of the base block up through an inclined aperture formed in the base block, thence to and through a tubular trapping tube of wire gauze as set forth.

2. A bug trap consisting of a base block and hemispherical wire gauze cover, the two secured together by a hook extending downward through the cover and interiorly engaging with a staple extending upward from the base block and arching over the entrance aperture with its two ends inserted into and secured to the base block as set forth.

3. A bug trap consisting of a base block and hemispherical wire gauze cover, the bottom of the base block cut or hollowed upward with an inclined aperture leading from beneath up to interior of trap chamber and to the interior of the opening a wire gauze trapping tube with a compressible free end, and the cover and base block held together by hook and staple as set forth.

4. A bug trap consisting of a wire gauze hemispherical cover, the cover having its rim resting upon the base block and the two secured together by hook and staple, the base block undercut and formed with inclined entrance aperture centrally located, finishing with a wire gauze trapping tube as set forth.

C. H. LAWTON.

Witnesses:
WM. W. MCMURRAY,
W. S. HANFORD.